US008820709B2

(12) United States Patent
Lombard et al.

(10) Patent No.: US 8,820,709 B2
(45) Date of Patent: Sep. 2, 2014

(54) WASTEGATES AND WASTEGATE COMPONENTS

(75) Inventors: Alain Lombard, Chavelot (FR); Nicolas Serres, Thaon les Vosges (FR)

(73) Assignee: Honeywell International Inc., Morristown, NJ (US)

( * ) Notice: Subject to any disclaimer, the term of this patent is extended or adjusted under 35 U.S.C. 154(b) by 512 days.

(21) Appl. No.: 13/047,177

(22) Filed: Mar. 14, 2011

(65) Prior Publication Data

US 2012/0234002 A1    Sep. 20, 2012

(51) Int. Cl.
*F16K 1/16*    (2006.01)

(52) U.S. Cl.
USPC .......... 251/301; 123/559.1; 123/564; 60/602; 60/612

(58) Field of Classification Search
USPC ............ 251/84, 86, 87, 299–301; 123/559.1, 123/564; 60/597–602, 612
See application file for complete search history.

(56) References Cited

U.S. PATENT DOCUMENTS

| | | | | |
|---|---|---|---|---|
| 1,980,495 A | * | 11/1934 | Muir | 251/86 |
| 3,395,727 A | * | 8/1968 | Weise et al. | 137/527.4 |
| 3,521,659 A | * | 7/1970 | Seger | 137/112 |
| 3,972,504 A | * | 8/1976 | DiSabatino et al. | 251/82 |
| 4,098,085 A | * | 7/1978 | McDowell | 60/602 |
| 4,719,757 A | * | 1/1988 | Nakazawa et al. | 60/602 |
| 5,046,317 A | * | 9/1991 | Satokawa | 60/602 |
| 8,424,304 B2 | * | 4/2013 | Serres et al. | 60/602 |
| 2004/0021117 A1 | * | 2/2004 | Chapman | 251/298 |
| 2006/0254273 A1 | * | 11/2006 | Grissom et al. | 60/602 |

FOREIGN PATENT DOCUMENTS

| | | |
|---|---|---|
| DE | 4439432 C1 | 11/1995 |
| DE | 102006022482 A1 | 12/2007 |
| DE | 102007034235 A1 | 1/2009 |
| WO | 2008071254 A1 | 6/2008 |
| WO | 2010135104 A2 | 11/2010 |

OTHER PUBLICATIONS

EPO Communication Application No. 12158688.7-1606/2508730 of May 14, 2013 (6 pages).
European Search Report Application No. 12158688.7-1606/2508730 of Mar. 19, 2013 (6 pages).

* cited by examiner

*Primary Examiner* — John K Fristoe, Jr.
*Assistant Examiner* — Marina Tietjen
(74) *Attorney, Agent, or Firm* — Brian J. Pangrle (57) ABSTRACT

A turbine housing includes a wastegate chamber with a wastegate opening; and a wastegate disposed in the wastegate chamber where the wastegate includes a plug configured to plug the wastegate opening and where the plug includes a surface; a shaft configured for receipt by a bore in a wall of the wastegate chamber; and a rotatable arm extending from the shaft where the arm has a surface configured for contacting the surface of the plug for a closed orientation of the plug with respect to the wastegate opening to transmit force from the arm more centrally to the plug. Various other examples of devices, assemblies, systems, methods, etc., are also disclosed.

13 Claims, 13 Drawing Sheets

WASTEGATES AND WASTEGATE COMPONENTS

TECHNICAL FIELD

Subject matter disclosed herein relates generally to turbomachinery for internal combustion engines and, in particular, to wastegates and wastegate components.

BACKGROUND

An exhaust wastegate is typically a valve that can be controlled to selectively allow at least some exhaust to bypass an exhaust turbine. Where an exhaust turbine drives a compressor for boosting inlet pressure to an internal combustion engine, a wastegate provides a means to control the boost pressure.

A so-called internal wastegate is integrated at least partially into a turbine housing. An internal wastegate typically includes a "flapper" valve, a crank arm, a shaft or rod, and an actuator. In a closed position, a wastegate flapper or plug needs to be seated with sufficient force to effectively seal an exhaust bypass (e.g., to prevent leaking of exhaust from a high pressure exhaust supply to a lower pressure region). Often, an internal wastegate is configured to transmit force from an arm to a plug. During engine operation, load requirements for a wastegate vary with pressure differential. High load requirements can generate high mechanical stresses in a wastegate's kinematics components, a fact which has led to significantly oversized component design to meet reliability levels (e.g., as demanded by engine manufacturers). Reliability of wastegate components for gasoline engine applications is particularly important where operational temperatures and exhaust pulsation levels can be quite high.

Various examples of wastegates and wastegate components are described herein, which can optionally provide for improved kinematics, reduced exhaust leakage, etc., when compared to conventional wastegates and conventional wastegate components.

BRIEF DESCRIPTION OF THE DRAWINGS

A more complete understanding of the various methods, devices, assemblies, systems, arrangements, etc., described herein, and equivalents thereof, may be had by reference to the following detailed description when taken in conjunction with examples shown in the accompanying drawings where.

DETAILED DESCRIPTION

Figure 1:
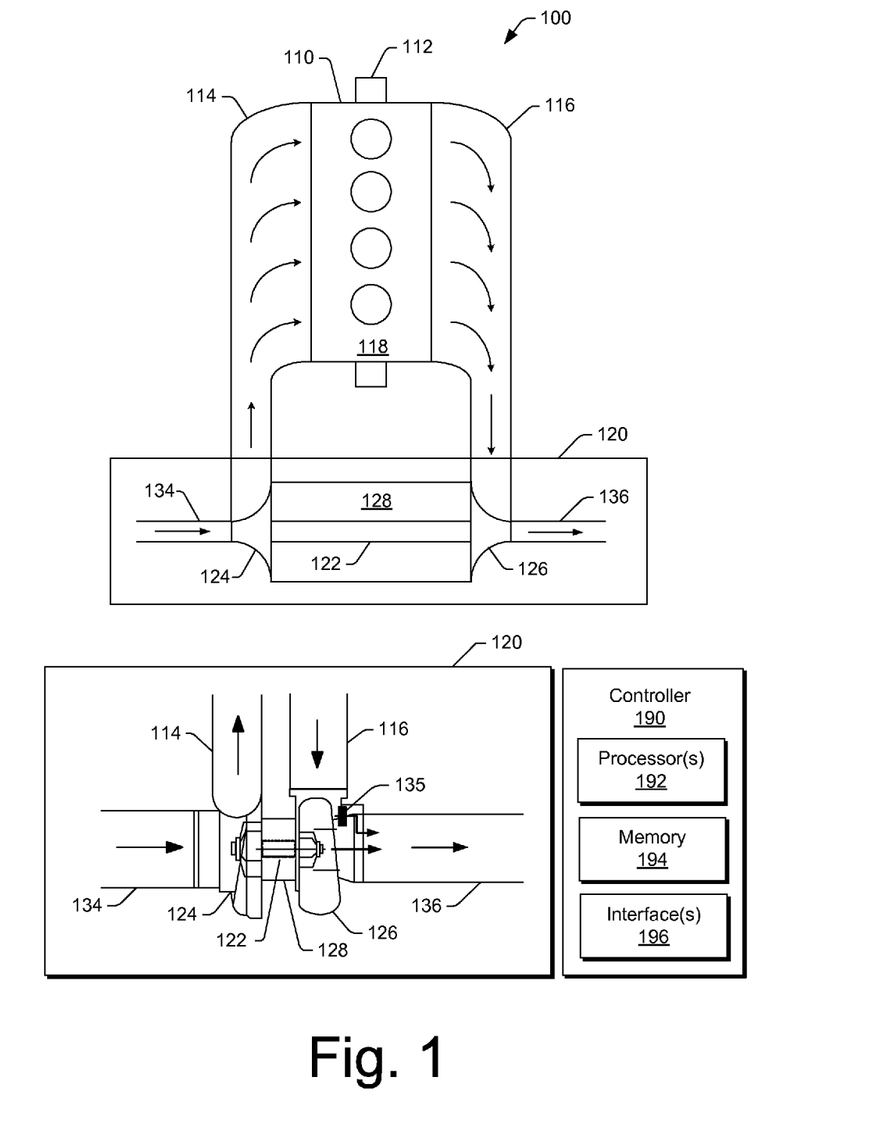
FIG. 1 is a diagram of a turbocharger and an internal combustion engine along with a controller.

Turbochargers are frequently utilized to increase output of an internal combustion engine. Referring to FIG. 1, a conventional system 100 includes an internal combustion engine 110 and a turbocharger 120. The internal combustion engine 110 includes an engine block 118 housing one or more combustion chambers that operatively drive a shaft 112 (e.g., via pistons). As shown in FIG. 1, an intake port 114 provides a flow path for air to the engine block 118 while an exhaust port 116 provides a flow path for exhaust from the engine block 118.

The turbocharger 120 acts to extract energy from the exhaust and to provide energy to intake air, which may be combined with fuel to form combustion gas. As shown in FIG. 1, the turbocharger 120 includes an air inlet 134, a shaft 122, a compressor 124, a turbine 126, a housing 128 and an exhaust outlet 136. The housing 128 may be referred to as a center housing as it is disposed between the compressor 124 and the turbine 126. The shaft 122 may be a shaft assembly that includes a variety of components. In the example of FIG. 1, a wastegate valve (or simply wastegate) 135 is positioned proximate to the inlet of the turbine 126. The wastegate valve 135 can be controlled to allow exhaust from the exhaust port 116 to bypass the turbine 126.

In FIG. 1, an example of a controller 190 is shown as including one or more processors 192, memory 194 and one or more interfaces 196. Such a controller may include circuitry such as circuitry of an engine control unit. As described herein, various methods or techniques may optionally be implemented in conjunction with a controller, for example, through control logic. Control logic may depend on one or more engine operating conditions. For example, sensors may transmit information to the controller 190 via the one or more interfaces 196. Control logic may rely on such information and, in turn, the controller 190 may output control signals to control engine operation. The controller 190 may be configured to control a variable geometry assembly, a wastegate, an electric motor, or one or more other components associated with an engine, an exhaust turbine (or exhaust turbines), a turbocharger (or turbochargers), etc. With respect to a wastegate, the controller 190 may be configured to act as an actuator or to transmit a signal to an actuator configured to actuate, for example, the wastegate valve 135 (e.g., to close or open a wastegate).

As described herein, various wastegates and wastegate components can optionally reduce loading to ensure acceptable leakage at a plug/seat interface of a wastegate opening or openings. In general, high load requirements generate high mechanical stresses in the kinematics parts of a wastegate, a fact which has led to significantly oversized part design to ensure requested reliability levels. In various examples described herein, an arm with a beveled surface can lead to a significant reduction in system loading (e.g., up to 20% or more compared to a conventional arm) while avoiding undesirable wastegate plug pre-opening. Such a beveled surface may be achieved by machining a conventional arm or by otherwise forming an arm with a beveled or clipped surface (e.g., from a plug axis up to a free end of the arm). Such an approach allows for relocation of an arm/plug loading point toward a plug center (e.g., optionally exactly at a plug center), which can, in turn, improve sealing efficiency with regard to both mechanical and aerodynamic phenomena.

As described herein, in various examples, a wastegate arm and plug may be configured as a ball and socket joint. For example, an arm may include a ball portion while a plug includes a socket portion or a plug may include a ball portion while an arm may include a socket portion. Such configurations can also allow for reduction in system loading while avoiding undesirable wastegate plug pre-opening. As to a ball and socket joint, one wastegate component may include only a portion of a "ball", for example, a convex, at least partially spherical surface, and an associated component may include a socket defined by a surface (e.g., concave) for contacting the "ball", which may be at least partially spherical or beveled or of another suitable, substantially complimentary shape.

As described herein, use of a wastegate with a beveled surface or a ball and socket joint can reduce exhaust leakage and improve low end behavior of a turbocharged engine. In trials for a wastegate arm with a beveled surface, both leak flow and on-engine low end performance have been measured showing benefits over a conventional wastegate arm (e.g., without a beveled surface). Further, as load is applied right at (e.g., or more closely to) the center of a plug, such an approach also allows a reduction of about 20% of the average load needed to ensure sealing of a wastegate opening.

As described herein, various wastegates and wastegate components may be applied to a conventional fixed nozzle turbine, a fixed-vaned nozzle turbine, a variable nozzle turbine, etc. As described herein, various wastegates and wastegate components may be applied to a twin scroll turbocharger.

Figure 2:
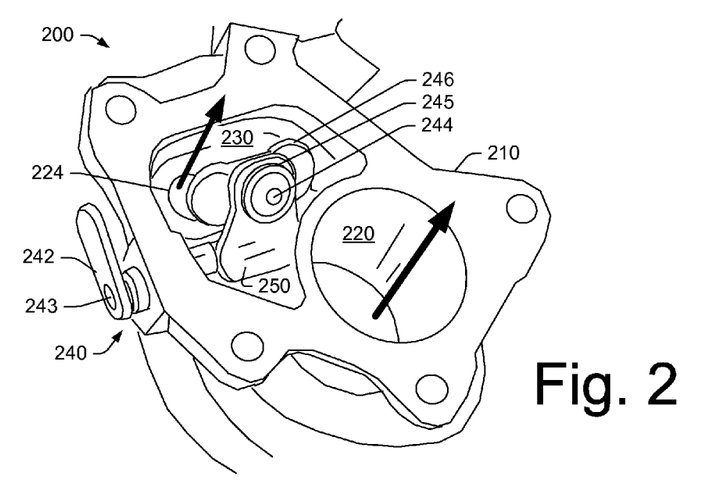
FIG. 2 is a perspective view of an assembly with a wastegate.
Figure 3:
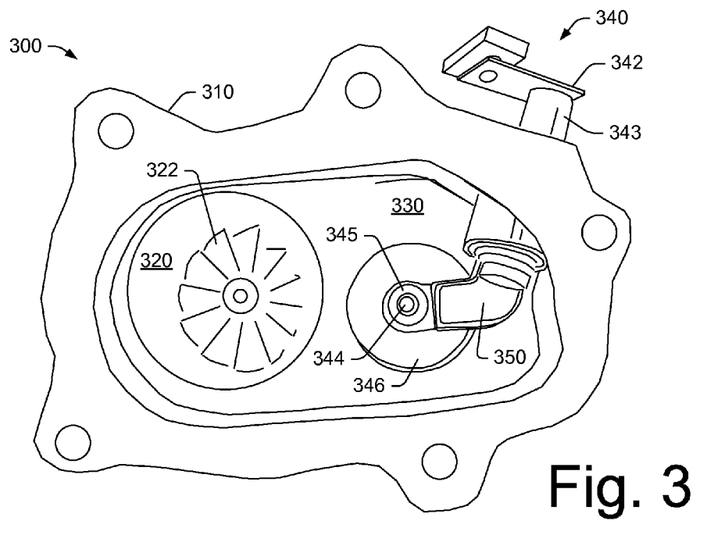
FIG. 3 is a perspective view of an assembly with a wastegate.

FIGS. 2 and 3 show example assemblies 200 and 300, each including a wastegate. The assembly 200 and the assembly 300 each include a housing 210 and 310, an exhaust flow chamber 220 and 320, a wastegate chamber 230 and 330 and a wastegate valve control mechanism 240 and 340. For the assembly 200 of FIG. 2, the exhaust flow chamber 220 is separated from the wastegate chamber 230; whereas, for the assembly 300 of FIG. 3, the chamber 320 joins the wastegate chamber 330. Further, the assembly 300 is shown as including a turbine wheel 322, which would be included in the assembly 200, downstream from the chamber 220.

The wastegate control mechanism 240 of the assembly 200 includes a control arm 242, a shaft 243, and a poppet arm 250 for moving a plug 246 between a fully closed position and a fully open position with respect to one or more openings 224. As shown in FIG. 2, the plug 246 is connected and attached to the poppet arm 250 via a peg or stem 244 and washer or retainer 245.

The wastegate control mechanism 340 of the assembly 300 includes a control arm 342, a shaft 343, and a poppet arm 350 for moving a plug 346 between a fully closed position and a fully open position. As shown in FIG. 3, the plug 346 is connected and attached to the poppet arm 350 via a peg or stem 344 and retainer 345. As shown in FIGS. 2 and 3, the plug 246 of the assembly 200 has a different shape than the plug 346 of the assembly 300.

Figure 4:
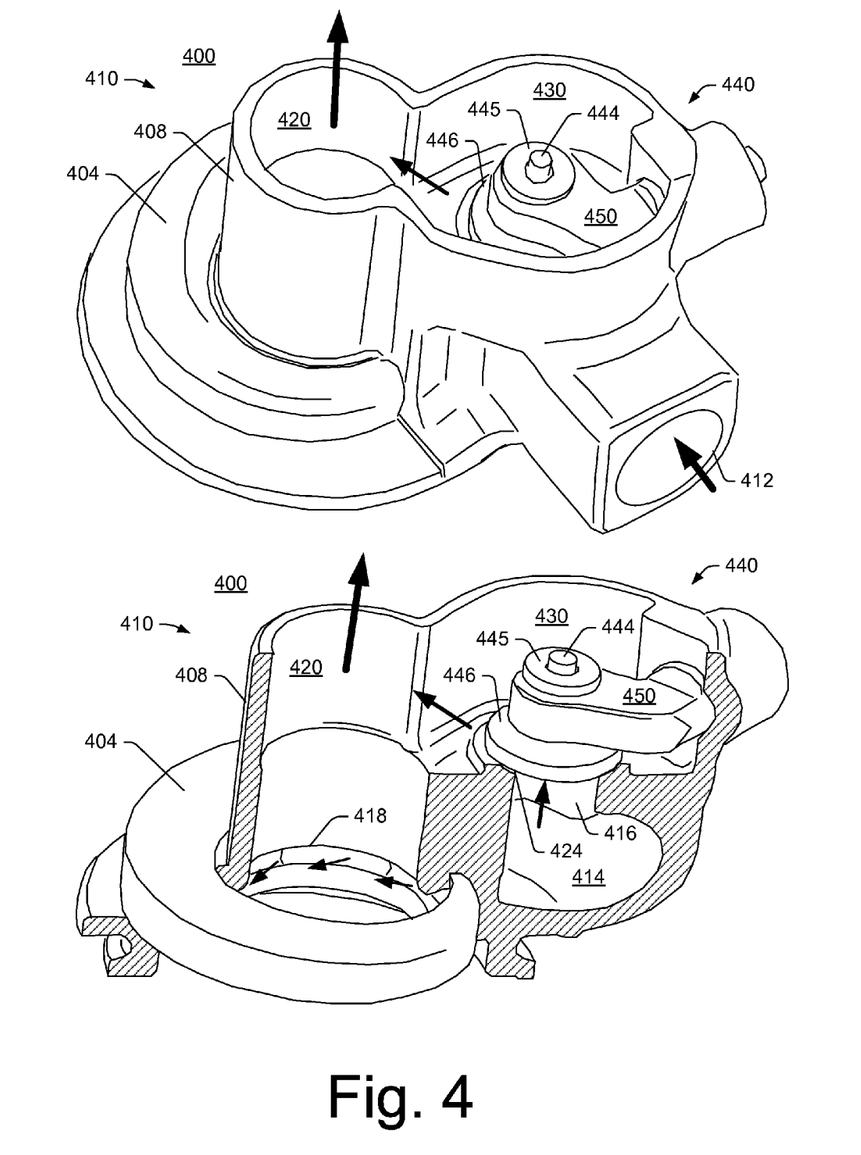
FIG. 4 is a perspective view and a cross-sectional view of an assembly with a wastegate.

FIG. 4 shows a perspective view and a cross-sectional view of an assembly 400 that includes a wastegate. The assembly 400 includes a housing 410, an exhaust flow chamber 420, a wastegate chamber 430 and a wastegate valve control mechanism 440. Also shown in FIG. 4 are a volute wall 404 and a substantially cylindrical housing wall 408, which, at least in part, defines the exhaust flow chamber 420.

The wastegate control mechanism 440 of the assembly 400 includes a poppet arm 450 for moving a plug 446 between a fully closed position and a fully open position. As shown in FIG. 4, the plug 446 is connected and attached to the poppet arm 450 via a peg or stem 444 and retainer 445.

The views of FIG. 4 also show the housing 410 as including an exhaust inlet 412, a volute chamber 414 and a passage 416 to a wastegate opening 424 leading to the wastegate chamber 430 as well as an opening 418 to direct exhaust to a turbine wheel (see, e.g., the wheel 322 of FIG. 3).

Regulation of exhaust from the volute chamber 414 to the wastegate chamber 430 occurs via the wastegate control mechanism 440 where the plug 446 is configured to plug the opening 424. The plug 446 is operably connected to the poppet arm 450 such that movement of the poppet arm 450 (e.g., via an actuator) can partially or fully open the opening 424 (i.e., for "waste gating" exhaust). Accordingly, the wastegate control mechanism 440 can control how much exhaust entering the assembly 400 via the inlet 412 is directed to the turbine wheel space via the opening 418. Exhaust flowing through the opening 424 to the wastegate chamber 430 joins the flow of exhaust from the chamber 420. One or more exhaust system components (e.g., of a vehicle) may be connected to an opening or openings of the assembly 400.

Figure 5:
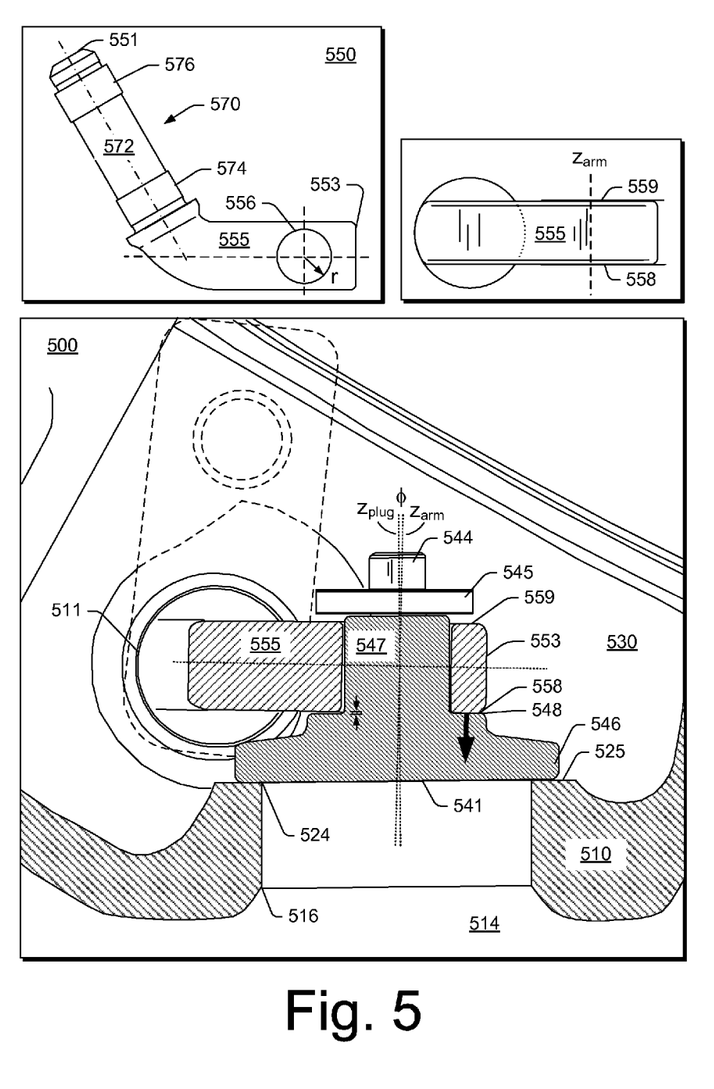
FIG. 5 is a top view of a shaft and arm component, a side view of an arm, and a cross-sectional view of an assembly with a conventional wastegate arm.

FIG. 5 shows a top view of a shaft and arm component 550, a side view of the arm 555 and a cross-sectional view through a portion of an assembly 500 with a wastegate. As shown in the top view, the shaft and arm component 550 may be a unitary component that includes a shaft portion 570 and an arm portion 555 located between a control end 551 and a chamber end 553. The shaft 570 includes a central shaft portion 572 disposed between a pair of journals 574 and 576 while the arm 555 extends from the shaft 570 at an angle and includes an opening 556 configured for receipt of a peg or stem 547 of a plug 546. As shown in the side view, the arm 555 has a planar lower surface 558 and a planar upper surface 559 (e.g., lying in planes orthogonal to a z-axis, $z_{arm}$, of the opening 556). As shown in the top view, the opening 556 extends between the lower surface 558 and the upper surface 559 with a radius r (i.e., defined about $z_{arm}$).

The cross-sectional view of FIG. 5 shows the assembly 500 as including a housing 510 that defines, at least in part, a volute chamber 514, a wastegate passage 516, a wastegate opening 524 and a wastegate chamber 530 where a wall of the wastegate chamber 530 includes a bore 511 configured for receipt of the shaft 570.

As described herein, an actuator may actuate a mechanism attached at the control end 551 of the shaft 570 to cause rotation of the shaft 570 in the bore 511 for purposes of the plug 546 opening or closing the wastegate opening 524. As described, the plug 546 is attached to the arm 555 via a peg or stem 547, which is received via the opening 556 in the arm 555. A portion 544 of the plug 546 may be part of the peg 547 or a separate part of an attachment mechanism that may cooperate with a retainer 545 to retain the plug 546 with respect to the arm 555. As described herein, various issues can arise during operation, which lead to exhaust leakage from the volute chamber 514 to the wastegate chamber 530 (e.g., via the passage 516 and the opening 524).

As shown in FIG. 5, the lower surface 558 of the arm 555 is planar and a surface 548 of the plug 546 is planar and orthogonal to a z-axis, $z_{plug}$, of the plug 546. As the arm 555 rotates, the surface 558 and the surface 548 may not align, as indicated by an angle φ between $z_{arm}$ and $z_{plug}$. In other words, for example, in a closed orientation of the plug 546 with respect to the opening 524, the planar surface 558 of the arm 555 is not parallel to the planar surface 548 of the plug 546. While a design may call for these two surfaces to be parallel at a particular angle of rotation, in practice, proper alignment, clearances, etc., may be difficult to achieve. Further, as substantial force must be applied to the plug 546 by the arm 555, changes in clearances (e.g., asymmetries) or wear may occur of one or more wastegate components such that any initial alignment is unlikely to be maintained during life of the wastegate.

In the example of FIG. 5, a thick arrow indicates how the arm 555 applies force to the plug 546 where the surfaces 548 and 548 are not parallel. Consequently, a gap exists between the arm 555 and the plug 546, as indicated by smaller, dimensional arrows. The example of FIG. 5 does not account for exhaust pressure, particularly high exhaust pressure in the volute chamber 514 and passage 516 and lower pressure in the wastegate chamber 530. Thus, in the example of FIG. 5, a face 541 of the plug 546 is shown as being parallel to and in contact with a planar surface 525 that surrounds the opening 524.

Figure 6:
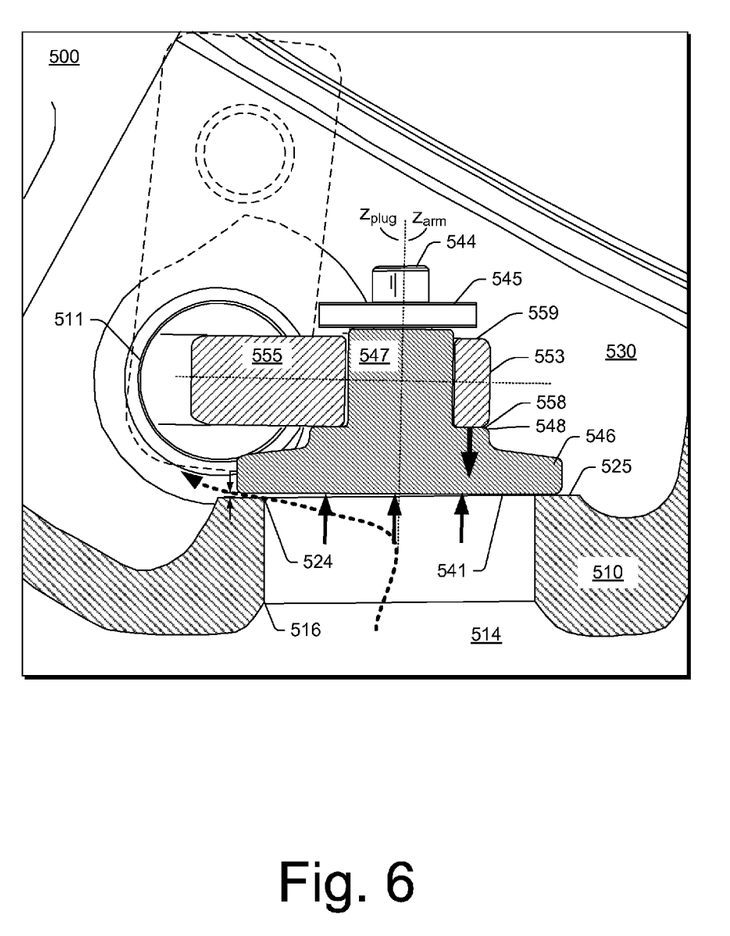
FIG. 6 is a cross-sectional view of the assembly of FIG. 5 demonstrating kinematics of exhaust leakage.

FIG. 6 shows a cross-sectional view of the assembly 500 where exhaust pressure exists in the passage 516, as indicated by a series of thick arrows that represent force of the exhaust against the face 541 of the plug 546. As the exhaust pressure forces the plug 546 upwards, the gap between the planar surface 548 of the plug 546 and the planar surface 558 of the arm 555 closes as the plug 546 tilts. While the tilt of the plug 546 may cause $z_{plug}$ and $z_{arm}$ to align (decrease φ), it causes misalignment of the face 541 and the surface 525 to thereby allow for leakage of exhaust from the opening 524 to the wastegate chamber 530.

As shown in FIGS. 2, 3, 4, 5 and 6, for a variety of reasons, wastegate valves are configured to move a plug attached to an arm by rotating a shaft about its axis. Over time, clearances between the various components (e.g., plug, arm, shaft, shaft bore, bushings, etc.) can change. Forces that can cause such change include aerodynamic excitation, high temperatures, temperature cycling (e.g., temperatures<−20 degrees C. to >1000 degrees C.), chemical attack, friction, deterioration of materials, etc. For at least the foregoing reasons, it can be difficult to maintain effective sealing of a wastegate opening over the lifetime of an exhaust turbine assembly. As to temperature, problems at high temperatures generally include wear and loss of function and consequently leakage, lack of controllability or a combination of leakage and uncontrollability.

Figure 7:
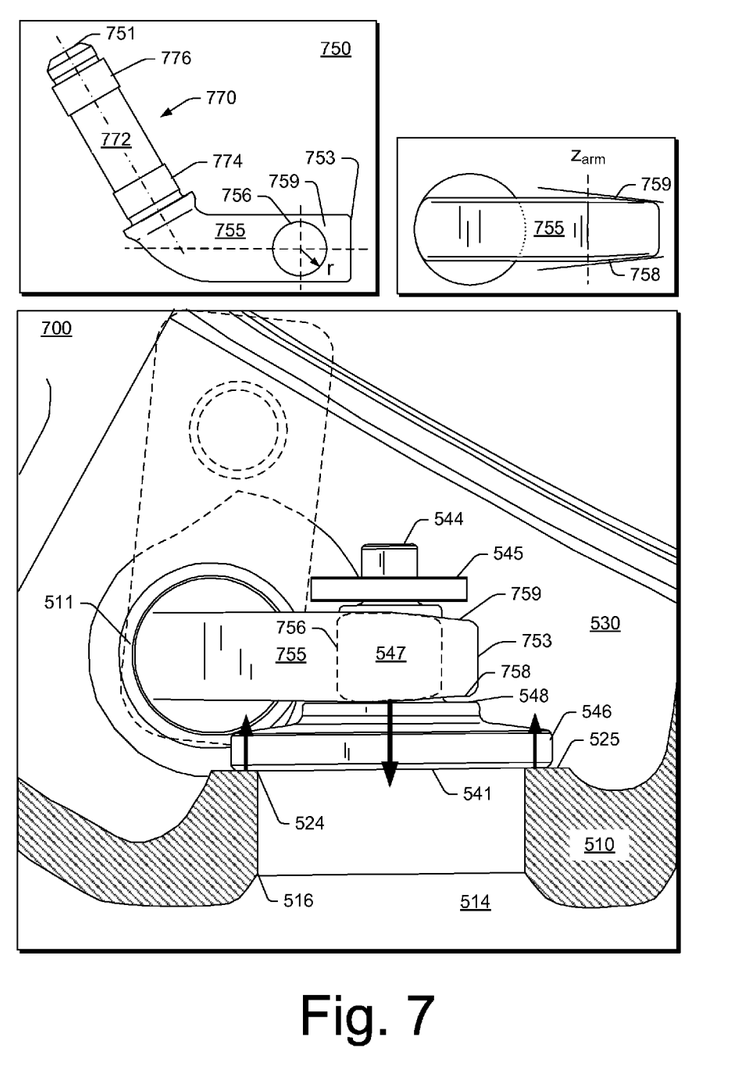
FIG. 7 is a top view of an example of a shaft and arm component, a side view of an example of an arm and a cross-sectional view of an example of an assembly with a wastegate arm demonstrating improved kinematics that can reduce exhaust leakage.

FIG. 7 shows a top view of an example of a shaft and arm component 750, a side view of an example of an arm 755 and a cross-sectional view of an example of an assembly 700 that includes the arm 755 for improved kinematics and reduction of exhaust leakage for a closed orientation of a wastegate.

As shown in the top view, the shaft and arm component 750 may be a unitary component that includes a shaft portion 770 and an arm portion 755 located between a control end 751 and a chamber end 753. In the example of FIG. 7, the shaft 770 includes a central shaft portion 772 disposed between a pair of journals 774 and 776 while the arm 755 extends from the shaft 770 at an angle and includes an opening 756 configured for receipt of a peg or stem 547 of a plug 546. As shown in the side view, the arm 755 has lower and upper surfaces 758 and 759 where a portion of the lower surface 758 is a beveled lower surface and a portion of the upper surface 759 is a beveled upper surface. As described herein, a beveled upper surface may be optional.

The cross-sectional view of FIG. 7 shows the assembly 700 as including a housing 510 that defines, at least in part, a volute chamber 514, a wastegate passage 516, a wastegate opening 524 and a wastegate chamber 530 where a wall of the wastegate chamber 530 includes a bore 511 configured for receipt of the shaft 770.

As described herein, an actuator may actuate a mechanism attached at the control end 751 of the shaft 770 to cause rotation of the shaft 770 in the bore 511 for purposes of the plug 546 opening or closing the wastegate opening 524. As described, the plug 546 is attached to the arm 755 via a peg or stem 547, which is received via the opening 756 in the arm 755. A portion 544 of the plug 546 may be part of the peg 547 or a separate part of an attachment mechanism that may cooperate with a retainer 545 to retain the plug 546 with respect to the arm 755. As described herein, the arm 755 can reduce exhaust leakage from the volute chamber 514 to the wastegate chamber 530 (e.g., via the passage 516 and the opening 524).

As shown in FIG. 7, the lower surface 758 of the arm 755 includes a beveled portion and a surface 548 of the plug 546 is planar (e.g., noting that the plug 546 may be symmetric and positioned or otherwise rotated at any angle with respect to the arm 755). In the example of FIG. 7, as the arm 755 rotates, the bevel of the lower surface 758 allows the arm 755 to contact the surface 548 at or near center of the plug 546 (e.g., to distribute force evenly across the face 541 of the plug 546). In other words, for example, in a closed orientation of the plug 546 with respect to the opening 524, the beveled portion of the lower surface 758 of the arm 755 has an angle sufficient to allow for contact between the arm 755 and the plug 546 more centrally (i.e., near the peg 547 as received by the opening 756). Further, even where an angle may exist between a central axis of a plug and a central axis of an opening of an arm, a beveled lower surface can provide for contact between the arm and the plug more centrally for application of force from the arm to the plug, which, in turn, allows for more even sealing of the plug. Whether any contact occurs on the beveled portion of the lower surface may depend on a variety of factors (e.g., alignment, wear, etc.). Noting that contact between the plug 546 and part of the beveled portion of the lower surface 758 (e.g., near commencement of the bevel) can provide for transmission of force from the arm 755 more centrally to the plug 546.

In the example of FIG. 7, thick arrows represent force applied by the arm 755 centrally to the plug 546 and distribution of the force to the surface 525, which imposes, in sum, an equal and opposite force where exhaust pressure is not present. Where exhaust pressure is present in the passage 516, the force applied by the arm 755 to the plug 546 should be sufficient to overcome the exhaust pressure experienced by the area of the face 541. Hence, the beveled portion of the lower surface 758 allows the arm 755 to avoid contact with the planar surface 548 of the plug 546 in a manner that might cause misalignment of contact and an opportunity for exhaust pressure in the passage 516 to tilt the plug 546 and cause leakage from the passage 516 to the wastegate chamber 530 for a closed orientation.

For some applications, an arm may be symmetric such that upon installation in an assembly, a beveled surface may be an upper surface or a lower surface. Accordingly, such an arm may have two beveled surfaces (see, e.g., the surfaces 758 and 759 of the side view of FIG. 7). Further, in such an example, force may be applied more evenly to a retainer for raising a plug to allow for passage of exhaust to a wastegate chamber and, correspondingly, decrease wear and increase longevity of a wastegate assembly.

As described herein, a wastegate assembly can include a plug configured to plug a wastegate opening where the plug includes a peg extending from a planar surface; a shaft configured for receipt by a bore in a wastegate chamber; and a rotatable arm extending from the shaft where the arm includes a peg opening configured for receipt of the peg of the plug and where the arm includes a lower surface that includes a beveled portion, the lower surface configured to contact the planar surface of the plug for a closed orientation of the plug with respect to the wastegate opening. In such an example, the beveled portion of the lower surface may have a bevel angle extending from a central axis of the peg opening toward a free end of the arm. As mentioned, an arm may include a beveled upper surface as well as a beveled lower surface.

As described herein, a plug may include a disk-shaped portion (e.g., defined by a height and a diameter). A plug typically includes a face configured to contact a surface surrounding a wastegate opening or openings.

As described herein, a beveled lower surface of an arm may have a bevel angle greater than approximately 10 degrees. In general, a beveled lower surface of an arm may have a bevel angle that depends on orientation of the arm with respect to a shaft and a closed orientation of a wastegate plug. For example, if a surface surrounding a wastegate opening defines a zero angle plane, the angle of an arm with respect to an axis of rotation of a shaft may define the bevel angle required to avoid misalignment between the arm and a plug configured to cover the wastegate opening. In general, the steeper the angle between the axis of rotation and the plane of the wastegate opening, the steeper the bevel. In various examples, an arm may be configured to reduce the effect of a steep angle between an axis of rotation and a plane of a wastegate opening, which may be taken into account when determining a bevel angle and manufacturing an arm.

As mentioned, a wastegate can include a ball and socket joint. Examples of wastegates with a ball and socket joint are shown in FIGS. 8 to 14.

Figure 8:
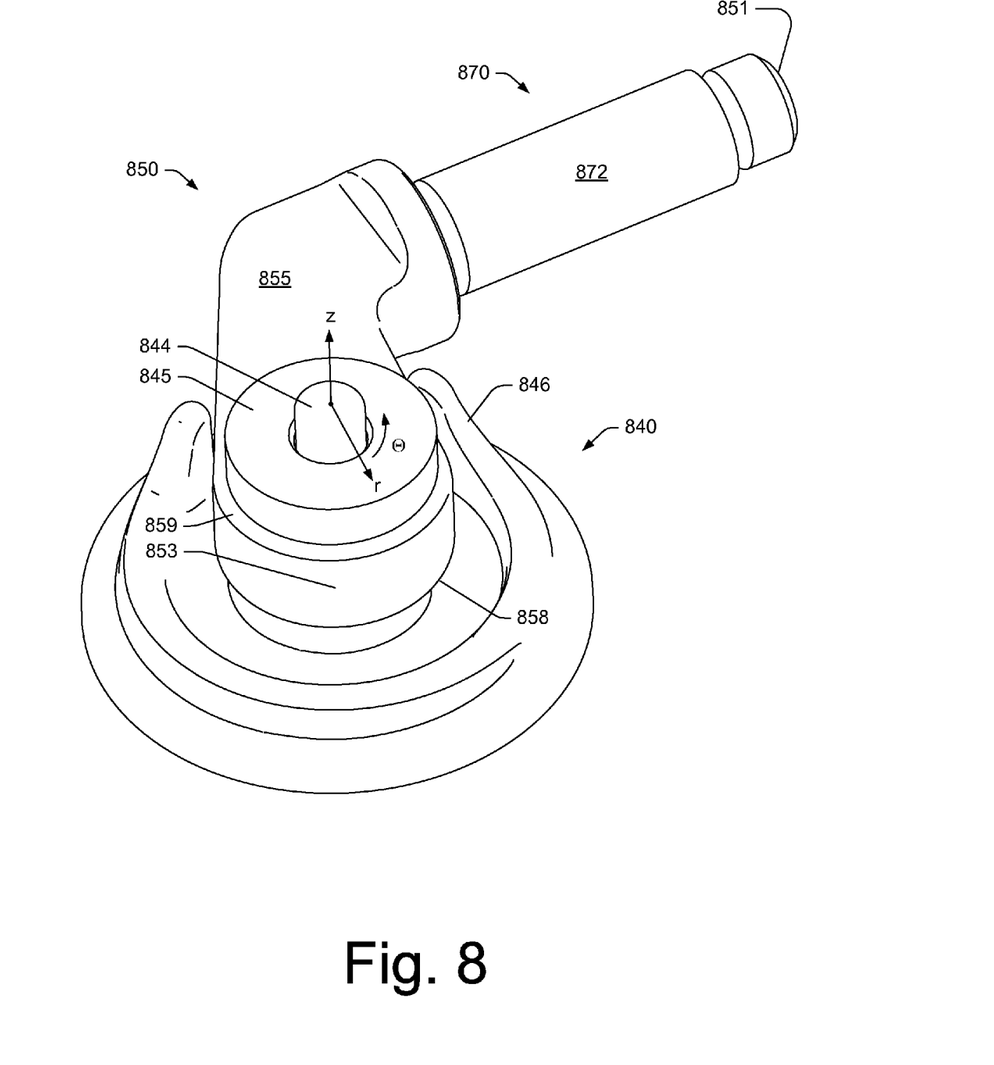
FIG. 8 is a perspective view of an example of wastegate arm and plug components provided as a subassembly.

FIG. 8 shows a perspective view of an example of a shaft and arm component 850 attached to a plug 840 along with a cylindrical coordinate system (r, z, Θ). In the example of FIG. 8, the shaft and arm component 850 may be a unitary component that includes a shaft portion 870 and an arm portion 855 located between a control end 851 and a chamber end 853. The shaft portion 870 may include a central portion 872 and optionally additional features, for example, for attachment of a control component for rotating the shaft 870.

Figure 9:
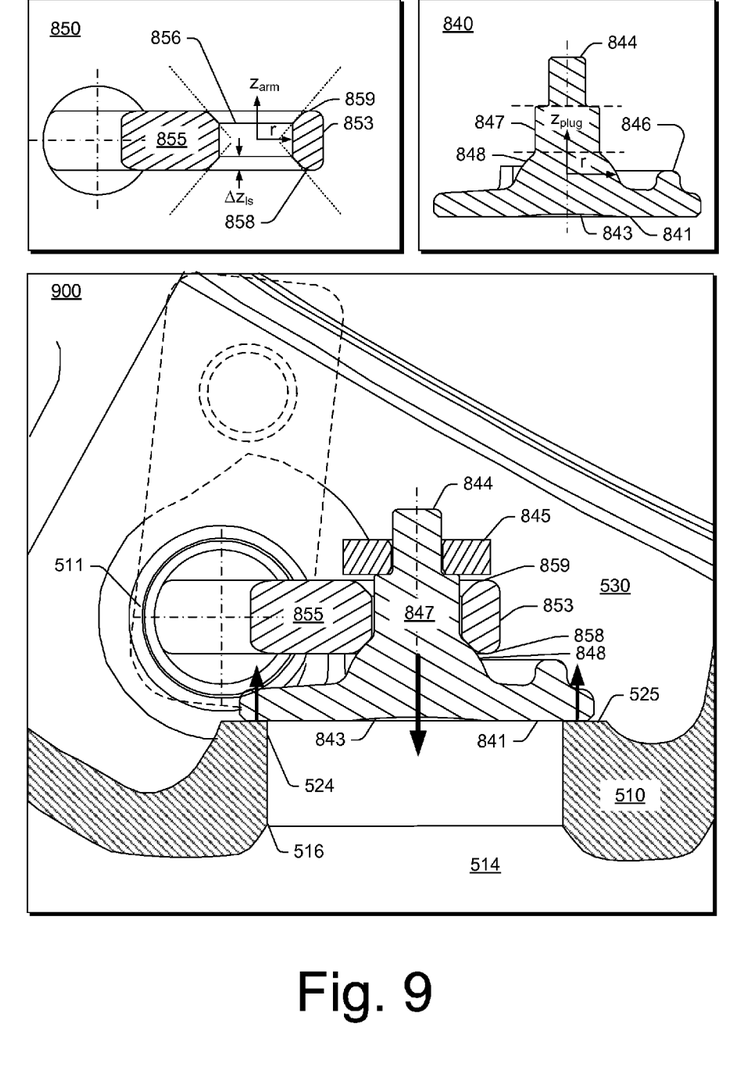
FIG. 9 is a series of cross-sectional views of the example of FIG. 8, including a cross-sectional view of an example of an assembly with a wastegate arm demonstrating improved kinematics that can reduce exhaust leakage.

In the example of FIG. 8, the arm 855 includes a lower surface 858 and an upper surface 859 where an opening extends between the lower surface 858 and the upper surface 859. As shown in FIG. 9, the plug 840 is attached to the arm 855 via a peg or stem 847, which is received via the opening 856 in the arm 855. A portion 844 of the plug 840 may be part of the peg 847 or a separate part of an attachment mechanism that may cooperate with a retainer 845 to retain the plug 840 with respect to the arm 855. The stem or peg 847 may have an axial height along a plug axis, $z_{plug}$, and a radius that is slightly smaller than a radius of the opening 856 of the arm 855. During operation, fit between the arm 855 and the plug 840 may adjust or adapt in a manner that helps to ensure that force is transmitted from the arm 855 to the plug 840 more centrally, such adjustment or adaptation may cause the arm axis $z_{arm}$ and the plug axis $z_{plug}$ to align or not align (e.g., depending on rotational angle of the arm 855 about an axis of the shaft 870 or other factors).

In the example of FIG. 8, the plug 840 includes an upwardly extending ridge 846 that spans an angle less than 360 degrees to accommodate the arm 855. As shown, the ridge 846 has a height that can be defined with respect to the z-axis, a width that can be defined with respect to the r-axis and a span that can be defined with respect to the azimuthal angle Θ.

FIG. 9 shows a cross-sectional view of the shaft and arm component 850 of FIG. 8, a cross-sectional view of the plug 840 of FIG. 8 and a cross-sectional view of an example of an assembly 900 that includes the shaft and arm component 850 and the plug 840 for improved kinematics and reduction of exhaust leakage for a closed orientation of a wastegate.

As shown in the cross-sectional view of the shaft and arm component 850 of FIG. 9, the lower surface 858 and the upper surface 859 include annular beveled or rounded portions adjacent the opening 856. For example, the lower surface 858 may be defined in part by an axial height $\Delta z_{ls}$ along a z-axis, $z_{arm}$, where a radius of the lower surface 858, along the r-axis, varies with respect to axial position (e.g., decreasing approaching the opening 856). As described herein, the opening 856 may be defined by a radius along the r-axis and an axial height along $z_{arm}$ (e.g., $\Delta z_o$). In general, such an opening, as configured to receive a stem or peg of a plug, may define $z_{arm}$. In the example of FIG. 9, both the lower surface 858 and the upper surface 859 include portions with varying radii as they approach the radius of the opening 856. As described herein, the upper and lower surfaces 858 and 859 may be symmetric about the azimuthal direction (e.g., an annular surface with a constant radius for a given axial position) or vary about the azimuthal direction (e.g., consider an annular surface with an elliptical or other shape). As described herein, the lower surface 858 may be shaped to receive the plug 840 in a particular orientation; noting that the ridge 846, which may be optional, can act to orient the plug 840 with respect to the arm 855.

As shown in the cross-sectional view of the plug 840, a rounded portion 848 has a radius along the r-axis that varies with respect to position along a z-axis, $z_{plug}$. As described herein, the rounded portion 848 may be symmetric about the azimuthal direction or vary about the azimuthal direction. In general, the shape of the rounded portion 848 of the plug 840 is substantially complimentary to the shape of the lower surface 858 of the arm 855, particularly to allow for distribution of force from the arm 855 to the plug 840 in a manner that acts to promote sealing and to avoid leaking of exhaust gas from a wastegate opening. Accordingly, while a rounded shape is shown for the portion 848 of the plug 840, an annular bevel or other shape may be provided that compliments the shape of a lower surface of an arm.

As shown in the cross-section view of the assembly 900, the beveled or rounded portion of the lower surface 858 is configured to contact the rounded surface 848 of the plug 840. As described herein, such an arrangement may be referred to as a ball and socket joint. Specifically, in the example of FIGS. 8 and 9, the arm 855 has a socket configured for receipt of a ball portion of the plug 840. The opening 856, which is configured for receipt of the stem 847, may be considered as being located above the socket. In the example of FIGS. 8 and 9, some clearance exists between the opening 856 and the stem 847 (e.g., radial clearance) to allow for a small amount of axial misalignment, if required, to promote seating of the rounded surface 848 against the lower surface 858 (e.g., consider a slight angle φ between $z_{arm}$ and $z_{plug}$). In turn, effective, centralized transmission of force from the arm 855 to the plug 840 (e.g., as indicated by arrows representing forces) can promote seating of the face 841 against the surface 525 to enhance sealing of the wastegate opening 524. Also shown in the example of FIG. 9, the plug 840 includes a centrally located concave recess 843 on the face 841, which may help to more favorably distribute forces exerted by exhaust (e.g., during pulsations, etc.). Specifically, the recess acts to increase surface area about $z_{plug}$, which can help concentrate force about $z_{plug}$; noting that the configuration of the arm 855 and plug 840 also act to transmit force to about $z_{plug}$. As described herein, a plug may optionally include a face surface feature that helps to direct force exerted by exhaust to help an arm maintain the plug in a closed orientation with respect to a wastegate opening.

As described herein, a wastegate assembly can include a plug configured to plug a wastegate opening where the plug includes a stem or a peg extending from a rounded surface; a shaft configured for receipt by a bore in a wastegate chamber; and a rotatable arm extending from the shaft where the arm includes an annular, beveled lower surface leading to a peg opening configured for receipt of the peg of the plug, where the annular, beveled lower surface is configured to contact the rounded surface of the plug for a closed orientation of the plug with respect to the wastegate opening. In such an example, the plug can include an upwardly extending ridge configured to orient the plug with respect to the arm.

As described herein, an arm can include an annular, beveled lower surface and an annular, beveled upper surface where such surfaces join a peg (or stem) opening, which may define a central axis. A peg opening may have a radius defined about a central axis, for example, where an annular, beveled upper surface and an annular, beveled lower surface have increasing radii with increasing axial distance from the peg opening.

Figure 10:
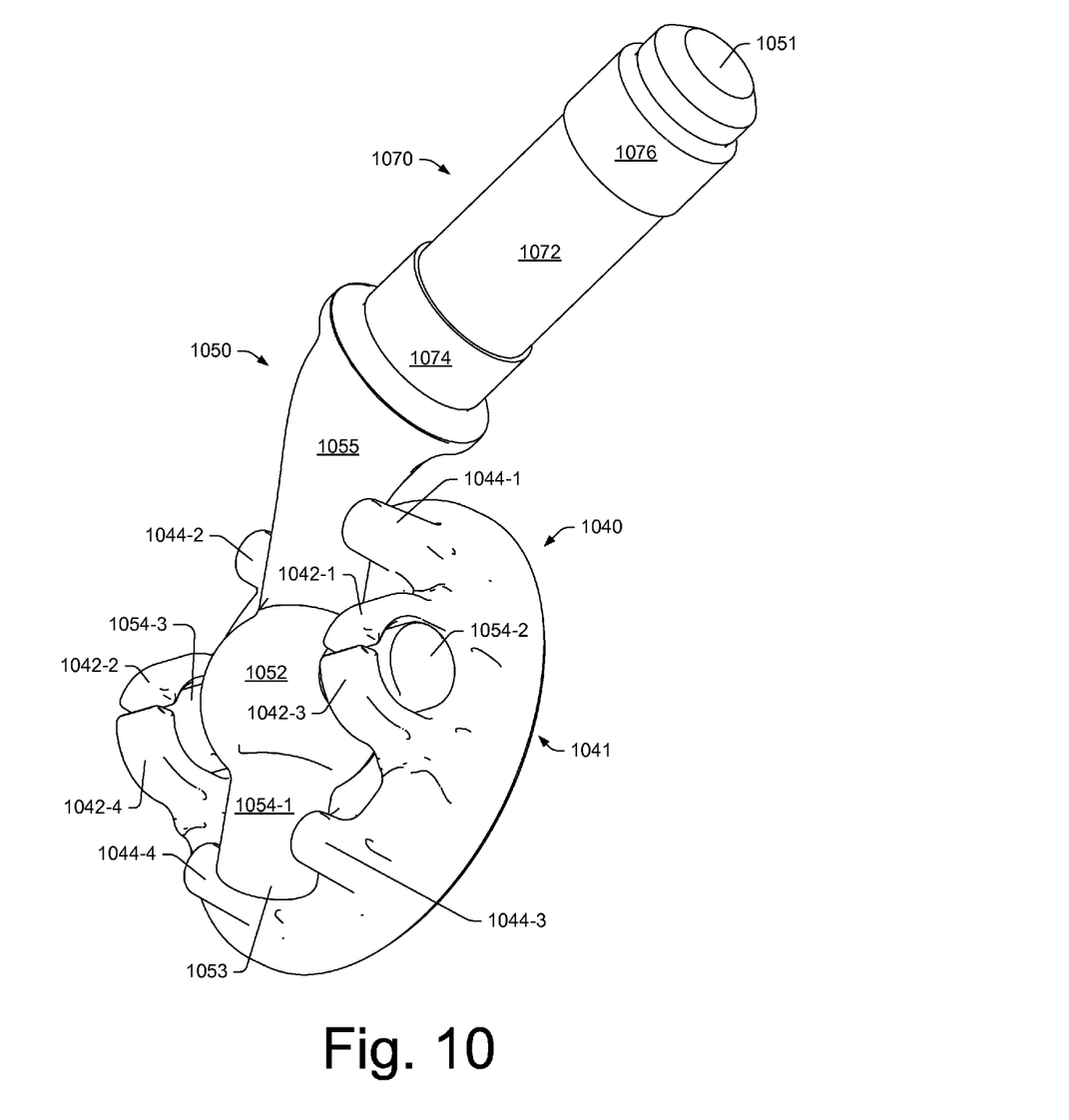
FIG. 10 is a perspective view of an example of wastegate arm and plug components provided as a subassembly.

FIG. 10 shows a perspective view of an example of a shaft and arm component 1050 attached to a plug 1040. In the example of FIG. 10, the shaft and arm component 1050 may be a unitary component that includes a shaft portion 1070 and an arm portion 1055 located between a control end 1051 and a chamber end 1053. In the example of FIG. 10, the shaft 1070 includes a central shaft portion 1072 disposed between a pair of journals 1074 and 1076 while the arm 1055 extends from the shaft 1070 at an angle and includes a bulbous portion with a convex, at least partially spherical surface 1052 from which various pegs extend 1054-1, 1054-2, and 1054-3.

The plug 1040 includes a face 1041; two sockets formed by respective pairs of bent posts 1042-1 and 1042-3 and 1042-2 and 1042-4; and a series of guides 1044-1, 1044-2, 1044-3 and 1044-4. As shown, the pegs 1054-2 and 1054-3 are received by the peg sockets while the guides 1044-1 and 1044-2 guide the arm 1055 and the guides 1044-3 and 1044-4 guide the peg 1054-1.

Figure 11:
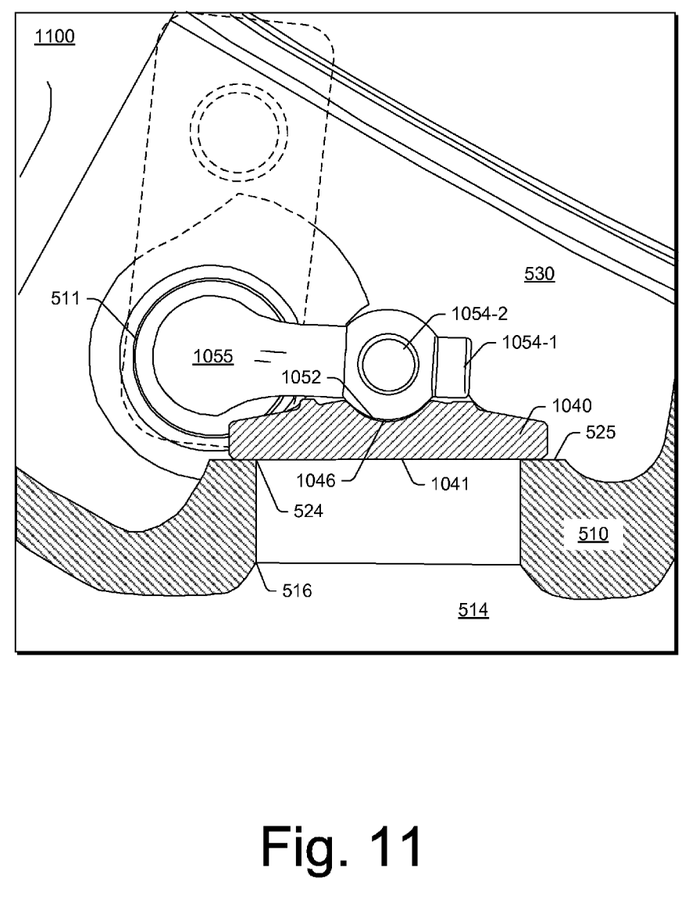
FIG. 11 is a cross-sectional view of an example of an assembly with the wastegate arm and plug subassembly of FIG. 10 demonstrating improved kinematics that can reduce exhaust leakage.

FIG. 11 shows a cross-sectional view of an example of an assembly 900 that includes the arm 1055 and the plug 1040 of FIG. 10 with respect to a housing 510. In the example of FIG. 11, the convex, at least partially spherical surface 1052 of the arm 1055 is seated in a concave, at least partially spherical surface 1046 of the plug 1040. Such an arrangement of surfaces allows the arm 1055 to apply force centrally to the plug 1040. Accordingly, misalignment that could result in tilting of the plug 1040 with respect to a planar surface 525 surrounding a wastegate opening 524 is reduced or avoided. As described herein, such a configuration may be referred to as a ball and socket joint, where the plug 1040 provides a socket for a ball portion of the arm 1055.

Figure 12:
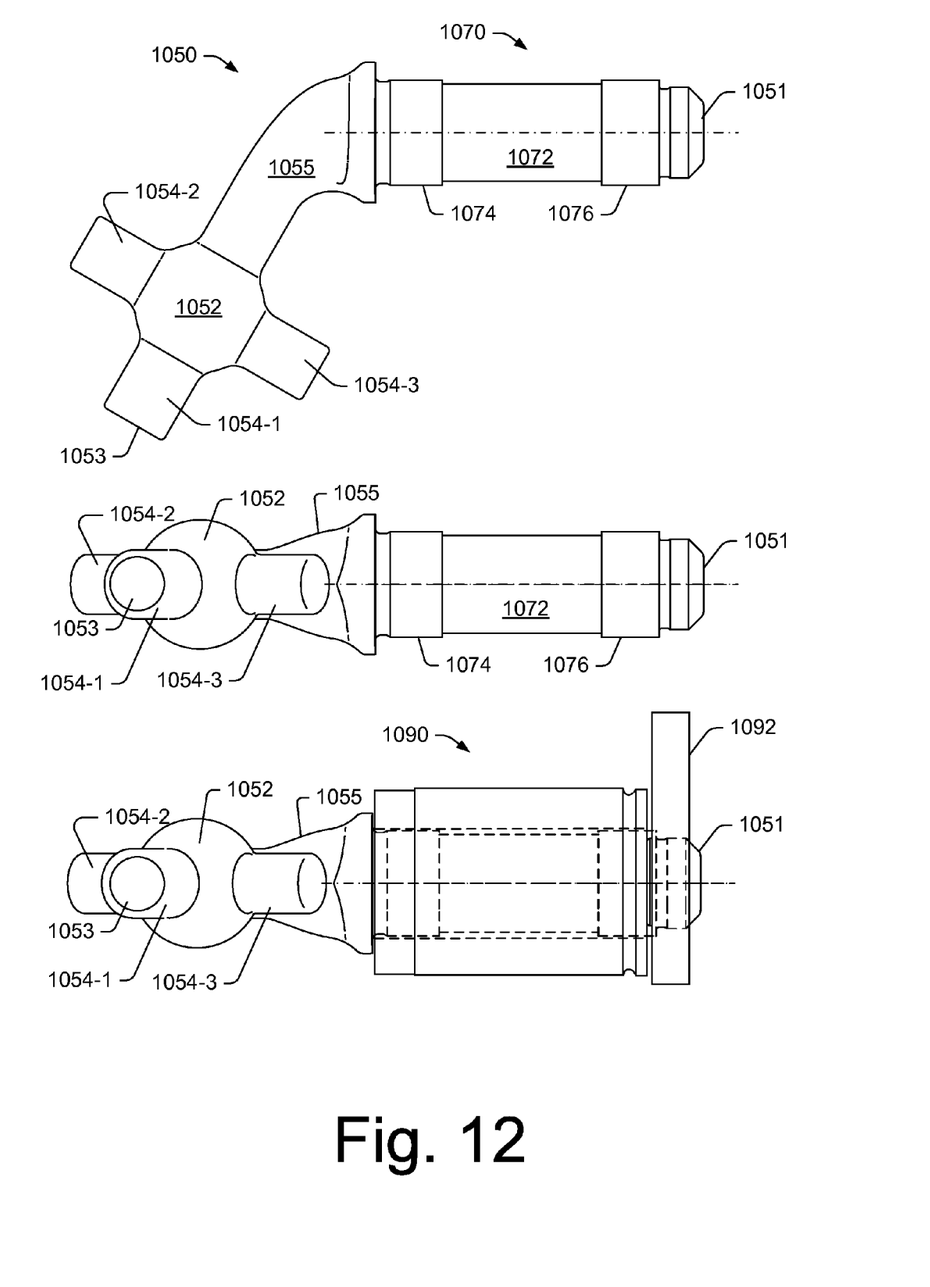
FIG. 12 is a series of views of the wastegate arm of FIG. 10 and an example of a bushing configured for receipt of a portion of the arm.

FIG. 12 shows a series of views of the shaft and arm component 1050 as well as a bushing 1090. As described herein, the shaft 1070 and the arm 1055 may be a unitary component, for example, machined from a single piece of material. Alternatively, the shaft 1070 and the arm 1055 may be separate component that are attached (e.g., by welding, a joint, etc.). For example, the arm 1055 may include a threaded socket for receipt of a threaded end of the shaft 1070. In another example, the arm 1055 may be welded to the shaft 1070. As shown in a side view of FIG. 12, a bushing 1090 may be provided with dimensions appropriate for seating in a bore of a housing. Such a bushing may be configured and arranged to reduce leakage of exhaust from a wastegate chamber to an exterior space. In the example of FIG. 12, a control arm 1092 is also shown as being connected to the shaft 1070 near its control end 1051.

Figure 13:
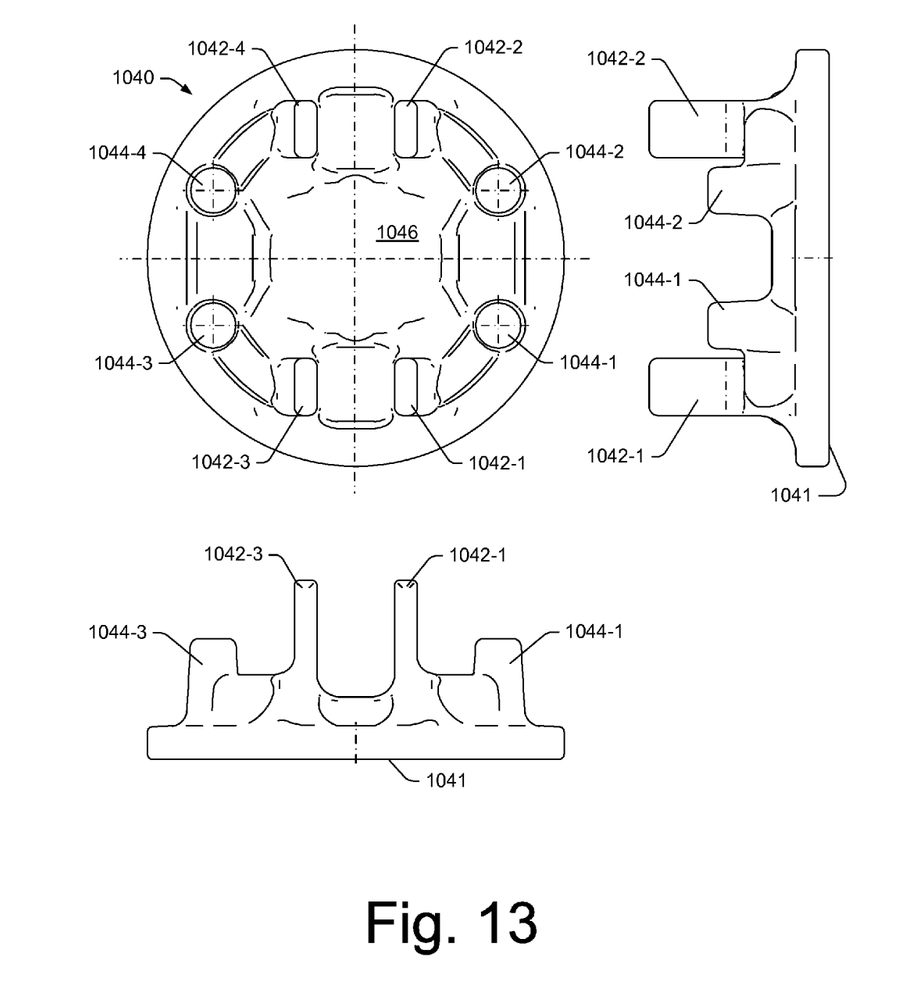
FIG. 13 is a series of views of the wastegate plug of FIG. 10.

FIG. 13 shows a series of views of the plug 1040. In a top view, the centrally located surface 1046 is shown. In general, the surface 1046 is concave and shaped to seat a ball-shaped portion of an arm (e.g., along a convex surface) where the plug 1040 may move with some limited amount of rotation with respect to the arm. For example, as shown in FIG. 12, the pairs of posts 1042-1 and 1042-3 and 1042-2 and 1042-4 are bent to form peg sockets for receipt of pegs 1054-2 and 1054-3. In the example of FIG. 13, the posts 1042-1, 1042-2, 1042-3 and 1042-4 are shown in straight or unbent configurations.

As described herein, a method may position a plug with posts in a wastegate chamber (e.g., optionally with guides), rotate an arm that includes pegs to position the arm with respect to the plug (e.g., optionally with assistance from guides) and bend the posts to form peg sockets for two of the pegs. In another example, a method may include assembling an arm and a plug prior to installing the arm and the plug in a wastegate chamber.

As described herein, a wastegate assembly can include a plug configured to plug a wastegate opening where the plug includes a concave, at least partially spherical surface; a shaft configured for receipt by a bore in a wastegate chamber; and a rotatable arm extending from the shaft where the arm includes a convex, at least partially spherical surface configured for contacting the concave, at least partially spherical surface of the plug for a closed orientation of the plug with respect to the wastegate opening.

As described herein, an arm can include at least a pair of pegs and a plug can include at least a pair of peg sockets configured for rotatable receipt of the pegs. As mentioned, such peg sockets may be formed by bending posts.

As described herein, an arm may include a pair of pegs that extend outwardly in a plane defined by a spherical surface of the arm.

As described herein, a plug can include a disk-shaped portion, a face configured to contact a surface surrounding a wastegate opening, etc. In various examples, a plug can include a face configured to contact a surface surrounding more than one wastegate opening.

Figure 14:
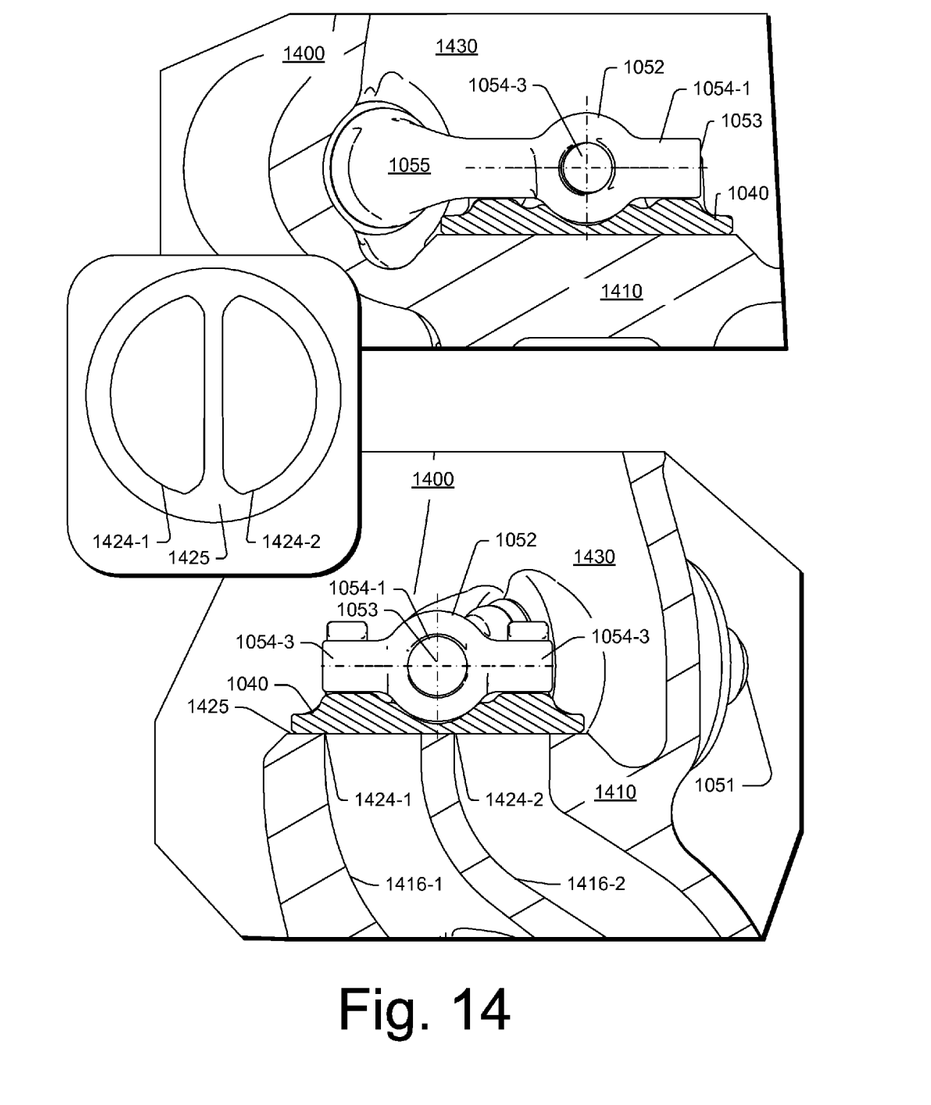
FIG. 14 is a series of views of an example of an assembly that includes the wastegate arm and plug of FIG. 10.

FIG. 14 shows various views of an example of an assembly 1400 that includes the arm 1055 and the plug 1040. The assembly 1400 includes a housing 1410 that has two passages 1416-1 and 1416-2 that lead to two openings 1424-1 and 1424-2 and to a chamber 1430. A top view also shows a surface 1425 that surrounds both of the openings 1424-1 and 1424-2. In the example of FIG. 14, the plug 1040 is shaped and sized to cover both of the openings 1424-1 and 1424-2 at the same time.

As described herein, a turbine housing can include a wastegate chamber that includes a wastegate opening, and a wastegate disposed in the wastegate chamber where the wastegate includes a plug configured to plug the wastegate opening where the plug includes a surface; a shaft configured for receipt by a bore in a wall of the wastegate chamber; and a rotatable arm extending from the shaft where the arm includes a surface configured for contacting the surface of the plug for a closed orientation of the plug with respect to the wastegate opening. In such an example, the surface may include a beveled surface or it may include a convex, at least partially spherical surface or it may be a concave, at least partially spherical surface (e.g., an annular beveled or rounded surface). The surface of a plug may be, for example, a planar, annular surface; a concave, at least partially spherical surface or a convex, at least partially spherical surface.

As described herein, various acts may be performed by a controller (see, e.g., the controller 190 of FIG. 1), which may be a programmable control configured to operate according to instructions. As described herein, one or more computer-readable media may include processor-executable instructions to instruct a computer (e.g., controller or other computing device) to perform one or more acts described herein (e.g., opening or closing a plug). A computer-readable medium may be a storage medium (e.g., a device such as a memory chip, memory card, storage disk, etc.). A controller may be able to access such a storage medium (e.g., via a wired or wireless interface) and load information (e.g., instructions and/or other information) into memory (see, e.g., the memory 194 of FIG. 1). As described herein, a controller may be an engine control unit (ECU) or other control unit configured to control operation of a wastegate valve (e.g., for purposes of engine performance, etc.).

Although some examples of methods, devices, systems, arrangements, etc., have been illustrated in the accompanying Drawings and described in the foregoing Detailed Description, it will be understood that the example embodiments disclosed are not limiting, but are capable of numerous rearrangements, modifications and substitutions without departing from the spirit set forth and defined by the following claims.

What is claimed is:

1. A wastegate assembly comprising:
    a plug configured to plug a wastegate opening wherein the plug comprises a peg extending from a planar surface;
    a shaft configured for receipt by a bore in a wastegate chamber; and
    an arm extending from the shaft to a free end wherein the arm comprises a peg opening disposed between the shaft and the free end that is configured for receipt of the peg of the plug, wherein the arm comprises a lower surface that comprises a beveled portion that comprises a bevel angle extending from a central axis of the peg opening toward the free end of the arm, and wherein, in a closed orientation of the plug with respect to the wastegate opening, a contact exists between the beveled portion of the arm and the planar surface of the plug at or near the center of the plug wherein the contact transfers force from the beveled portion to the planar surface responsive to rotation of the shaft.

2. The wastegate assembly of claim 1 wherein the arm comprises a beveled upper surface.

3. The wastegate assembly of claim 2 further comprising a retainer configured for attachment to the peg to retain the plug on the arm wherein the beveled upper surface of the arm is configured to contact a planar surface of the retainer for an open orientation of the plug with respect to the wastegate opening.

4. The wastegate assembly of claim 1 wherein the plug comprises a disk-shaped portion.

5. The wastegate assembly of claim 1 wherein the plug comprises a face configured to contact a surface surrounding a wastegate opening.

6. The wastegate assembly of claim 1 wherein the beveled portion of the lower surface comprises a bevel angle greater than approximately 10 degrees.

7. The wastegate assembly of claim 1 wherein the shaft and the arm comprise a unitary component.

8. The wastegate assembly of claim 1 wherein the plug comprises a peg axis and wherein the peg of the plug extends from the planar surface along the peg axis.

9. The wastegate assembly of claim 8 wherein the plug opening of the arm comprises a plug opening axis.

10. The wastegate assembly of claim 9 wherein for the closed orientation of the plug with respect to the wastegate opening, the beveled portion of the lower surface of the arm contacts the planar surface of the plug and offsets the plug opening axis from the peg axis.

11. The wastegate assembly of claim 1 wherein the planar surface comprises an annular planar surface.

12. The wastegate assembly of claim 1 further comprising a turbocharger turbine housing that defines the wastegate chamber.

13. The wastegate assembly of claim 12 further comprising a turbocharger that comprises the turbine housing.

* * * * *